US011734779B2

(12) United States Patent
Theiss et al.

(10) Patent No.: US 11,734,779 B2
(45) Date of Patent: *Aug. 22, 2023

(54) METHODS OF ALLOCATING ENERGY GENERATED BY A COMMUNITY SOLAR ENERGY SYSTEM

(71) Applicant: Arcadia Power, Inc., Washington, DC (US)

(72) Inventors: Katherine Theiss, Washington, DC (US); Lindsey Maddox, Alexandria, VA (US); Jake Yesbeck, Richmond, VA (US); Daniel Parker, Washington, DC (US); Angela He, Washington, DC (US); Joel Gamoran, Washington, DC (US); Matthew Bailey, Washington, DC (US)

(73) Assignee: Arcadia Power, Inc., Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/704,097

(22) Filed: Mar. 25, 2022

(65) Prior Publication Data

US 2022/0215489 A1 Jul. 7, 2022

Related U.S. Application Data

(63) Continuation of application No. 16/942,045, filed on Jul. 29, 2020, now Pat. No. 11,315,200.

(51) Int. Cl.
*G06Q 30/02* (2023.01)
*G06Q 50/06* (2012.01)
(Continued)

(52) U.S. Cl.
CPC ......... *G06Q 50/06* (2013.01); *G06Q 30/0205* (2013.01); *G06Q 30/0224* (2013.01)

(58) Field of Classification Search
CPC .... G06Q 30/02; G06Q 50/06; G06Q 30/0205; G06Q 30/0224; G06Q 30/0254;
(Continued)

(56) References Cited

U.S. PATENT DOCUMENTS

| 2010/0057480 A1* | 3/2010 | Arfin | G06Q 50/06 |
| | | | 705/14.31 |
| 2011/0184863 A1* | 7/2011 | Coleman | G06F 16/93 |
| | | | 705/40 |

(Continued)

FOREIGN PATENT DOCUMENTS

| CN | 102156463 | 8/2011 |
| CN | 102156463 A | 8/2011 |

(Continued)

OTHER PUBLICATIONS

Anuj Mittal; Caroline C. Krejci, Integrating Consumer Preferences in renewable energy expansion planning using agent-based modelling (English), 217 Winter Simulation Conference (WSC) (pp. 2696-2707), Dec. 1, 2017 (Year: 2017).*

(Continued)

*Primary Examiner* — Marilyn G Macasiano
(74) *Attorney, Agent, or Firm* — Butzel Long (57) ABSTRACT

Implementations of the disclosed subject matter may provide a method of retrieving a data record including historic utility bill statements of a customer, determining a historic energy usage rate of the customer based on the retrieved data record, and determining whether the customer is eligible to subscribe to a community solar energy generating system based on geographic location of the community solar energy generating system, the determined historic energy usage rate of the customer, and the customer's geographic location. The method may determine an allocation of energy produced by the community solar energy generating system when the eligible customer is enrolled in a subscription to (Continued)

the community solar energy generating system. The method may generate a customer data record for the user based on credits for the allocation of energy of the community solar energy generating system and receiving energy from another energy generating system.

13 Claims, 7 Drawing Sheets

(51) Int. Cl.
*G06Q 30/0204* (2023.01)
*G06Q 30/0207* (2023.01)

(58) Field of Classification Search
CPC ............ G06Q 10/067; G06Q 30/0246; G06Q 30/0207; Y04S 50/14
See application file for complete search history.

(56) References Cited

U.S. PATENT DOCUMENTS

| | | | | |
|---|---|---|---|---|
| 2013/0338845 | A1* | 12/2013 | Jerphagnon | G06F 1/26 700/297 |
| 2014/0129042 | A1* | 5/2014 | Miner | H02J 3/00 700/295 |
| 2015/0339762 | A1* | 11/2015 | Deal | G06Q 30/0283 705/27.1 |
| 2016/0062380 | A1* | 3/2016 | Schwarz | G05F 1/66 700/295 |

FOREIGN PATENT DOCUMENTS

| | | | | |
|---|---|---|---|---|
| WO | WO 2014/14792 | A1 * | 1/2014 | ............... H02J 3/38 |
| WO | WO 2014/014792 | A1 * | 1/2014 | ............... H02J 3/38 |
| WO | 2015031593 | A1 | 3/2015 | |

OTHER PUBLICATIONS

IEEE Draft Guide for Smart Distribution Applications Guide (English), IEEE P1854/D006, Mar. 2017 (pp. 1-76), Apr. 12, 2017 (Year: 2017).*

Rathnayaka, A.J.D.; Potdar, V.M.; Hussain, O.; Dillon, T., Identifying prosumer's energy sharing behaviours for forming optimal prosumer-communities (Englsih), 2011 International Conference on Cloud and Service Computing (pp. 199-206), Dec. 1, 2011 (Year: 2011).*

Chakraborty, Pratyush; Baeyens, Enrique; Khargonekar, Pramod P.; Poolla, Kameshwar; Varaiya, Pravin, Analysis of Solar Energy Aggregation under Various Billing Mechanisms (English), Aug. 19, 2017 (Year: 2017).*

Strobbe, M; Verschueren, T.; Melis, S.; Verslype, D.; Mets, K.; De Turek, F.; Develder, C., Design of a management infrastructure for smart grid pilot data processing and analysis (English), 2013 IFIP/IEEE Inter Symp on Integrated Network management (IM 2013) (pp. 547-553), Aug. 23, 2013 (Year: 2013).

Canadian Office Action issued in App. No. CA3126538, dated Nov. 15, 2022, 4 pages.

J. McLean Sloughter; J. Isackson; Y.P. Mak; A.k. Sleicher; H. Louie; K. Shields; M. Salmon, Designing a sustainable business plan for an off-grid energy kiosk in Chalokwa, Zambia (Englcish), 2016 IEEE Global Humanitarian Technology Conference (GHTC) ( pp. 401-405) Mar. 3, 2017 (Year: 2017).

* cited by examiner

METHODS OF ALLOCATING ENERGY GENERATED BY A COMMUNITY SOLAR ENERGY SYSTEM

BACKGROUND

Presently, customers in certain utility territories are able to subscribe to the energy generated by renewable energy sources, such as wind power, solar power, and the like as a service separate from their traditional energy distribution company and/or supplier, such as a utility company. Customers who separately subscribe to a renewable energy source and a traditional utility company receive separate bills, along with separate information regarding energy consumption or usage, and energy generation of the renewable energy source. If any credits are being granted by the utility company or others for the generation of renewable energy, the customer has to provide sufficient documentation in order to achieve savings from these credits. Frequently, it can be difficult for customers to determine what savings, environmental impacts, or the like their subscription to renewable energy is providing.

BRIEF SUMMARY

According to an implementation of the disclosed subject matter, a method may be provided for retrieving, from a database communicatively coupled to a server, a data record including at least one historic utility bill statement of a customer. The method may determine, at the server, a historic energy usage rate of the customer based on the retrieved data record, and may determine whether the customer is eligible to subscribe to a community solar energy generating system based on a geographic location of the community solar energy generating system, the determined historic energy usage rate of the customer, and the geographic location of the customer. The server may determine an allocation of energy produced by the community solar energy generating system when the eligible customer is enrolled in a subscription to the community solar energy generating system. The method may generate a customer data record based on one or more credits for the allocation of energy from the community solar energy generating system and based on receiving energy from another energy generating system. The method may transmit, from the server via a communications network, the customer data record to a device of the customer to be displayed.

Additional features, advantages, and implementations of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Implementations of the disclosed subject matter disclose dynamically and continuously managing energy allocation for a community solar energy generating system. Such implementations may include determining whether a customer is eligible to subscribe to the community solar energy generating system, determining how much energy generated by the community solar energy generating system to allocate to the customer, and ensuring that all energy generated by the community solar energy generating systems are provided to customers. The implementations of the disclosed subject matter may provide increased efficiency and accuracy of energy allocation and usage, which may provide for increased development and management of community solar energy generating systems. Such implementations may allow for more customers to efficiently have access to and utilize solar energy. This may reduce energy costs for consumers, and may reduce the reliance upon non-renewable energy sources and/or reduce environmental pollution.

Implementations of the disclosed subject matter may dynamically determine eligibility information about customers that may currently subscribe to the community solar energy generating system and/or may subscribe to the system in the future. Traditionally, tracking annualized usage information required substantial documentation, which is both time prohibitive and prone to error. Implementations of the disclosed subject matter provide dynamic information about energy allocation of community solar energy generating systems, which may allow for the assignment of customers to community solar energy generating system projects, and provide solar energy subscription information, including credits, to utilities and other partners.

Implementations of the disclosed subject matter provide integrated management of customers, including determining which customers may be eligible to receive energy allocations from a community solar energy generating system, and dynamically managing customers who may be eligible and/or may subscribe to the community solar energy generating system when energy needs of other customers change. This may provide increased efficiency in energy allocation and management of energy generated by a renewable energy source that may have reduced environmental impacts.

Implementations of the disclosed subject matter may determine whether a customer is eligible to receive energy from a community solar energy generating system. Such implementations may dynamically determine the annual energy usage of the customer, and may determine how much energy generated by the community solar energy generating system to allocate to the customer. Implementations of the disclosed subject matter may determine the one or more customers that may subscribe to the energy generated by the community solar energy generating system, and/or may adjust the energy allocations for the one or more subscribed customers, and/or adjust the number of subscribed customers.

Figure 1:
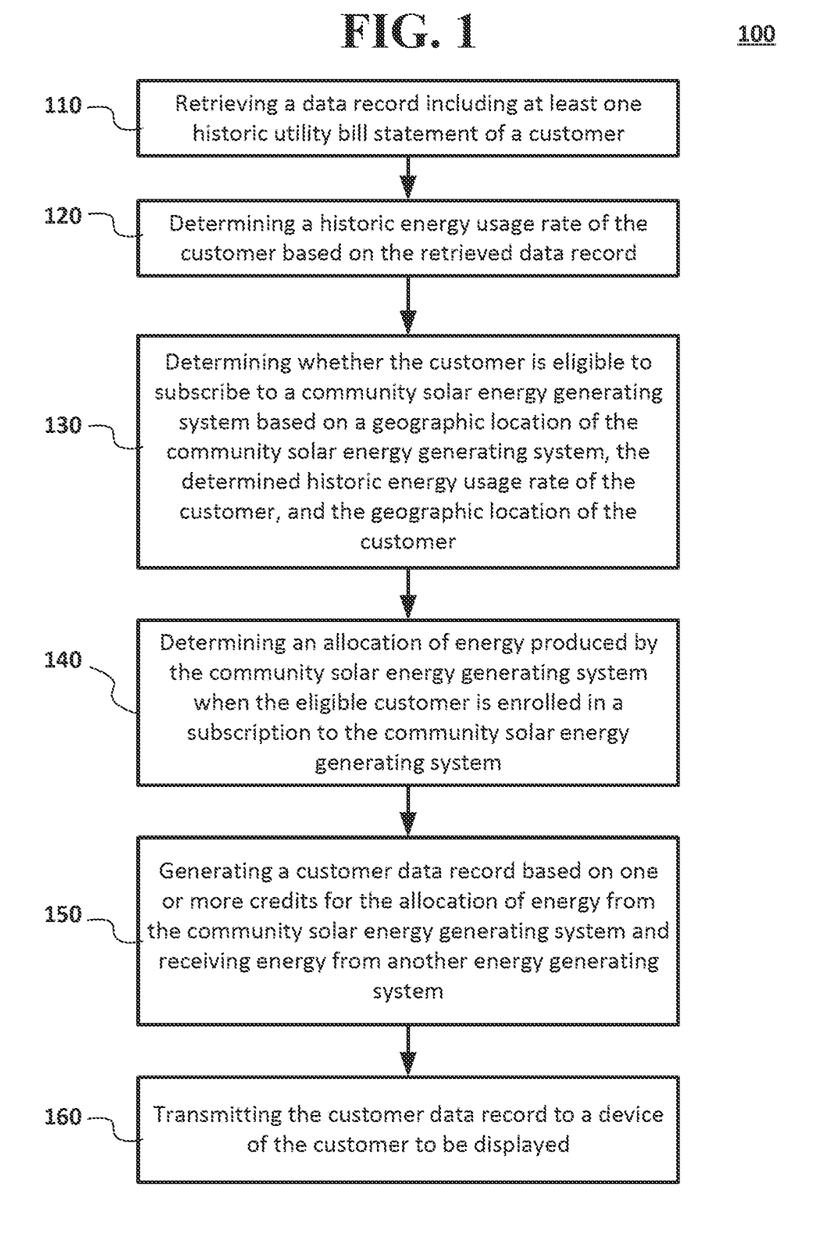
FIG. 1 shows an example method of determining whether the customer is eligible to receive energy generated by a community solar energy generating system, and determining an allocation of energy when the eligible customer enrolls in a subscription to the community solar energy generating system according to an implementation of the disclosed subject matter.

FIG. 1 shows an example method 100 of determining whether the customer is eligible to subscribe to a community solar energy generating system and determining an allocation of energy when the eligible customer enrolls in a subscription to the community solar energy generating system according to an implementation of the disclosed subject matter.

Figure 3:
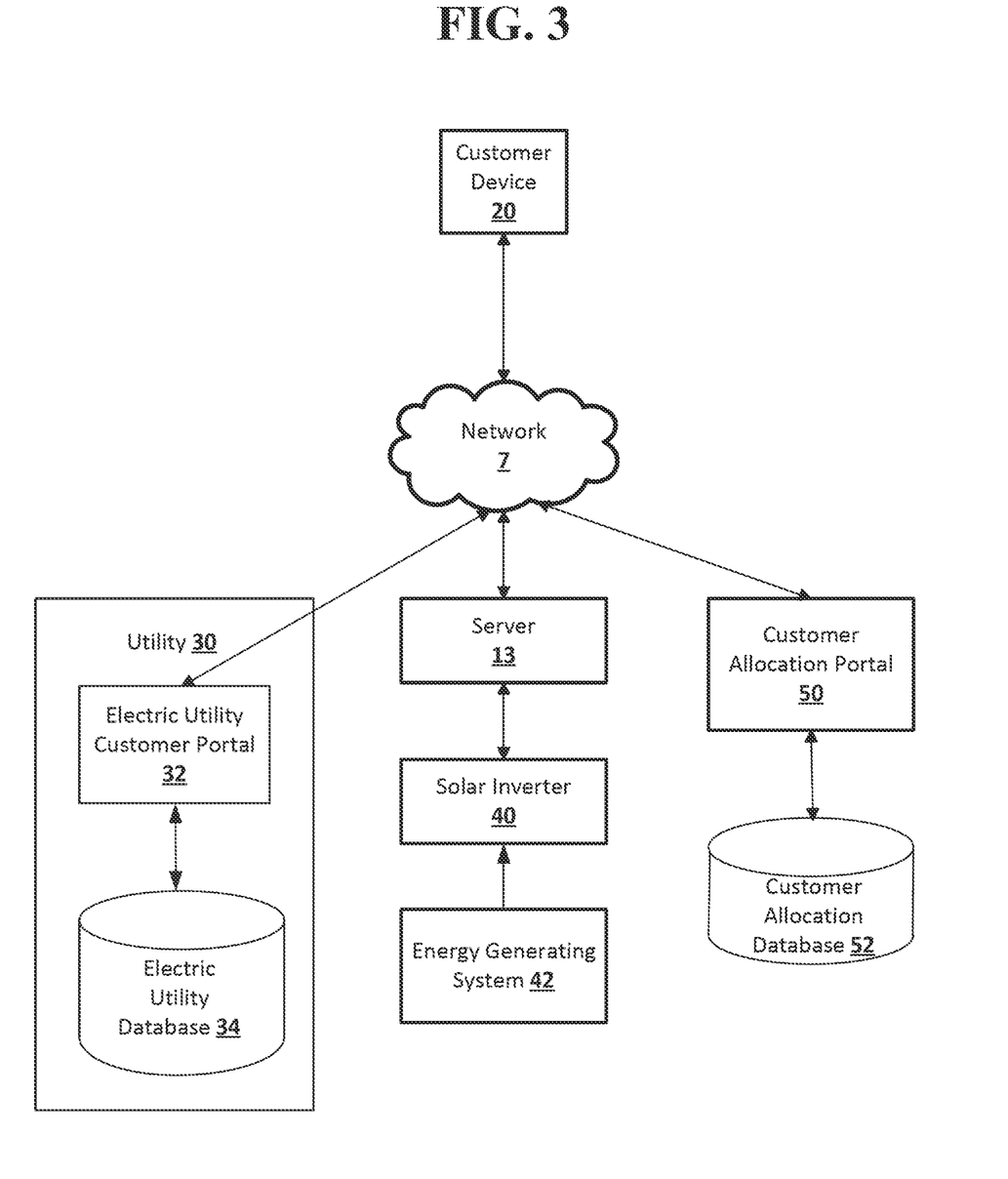
FIG. 3 shows a network arrangement of energy generating systems, servers, databases, and customer devices according to an implementation of the disclosed subject matter.

At operation 110, a data record including at least one historic utility bill statement of a customer may be retrieved by a server of a customer allocation portal (e.g., customer allocation portal 50 shown in FIG. 3 and described below) from a database (e.g., electric utility database 34 shown in FIG. 3) that is communicatively coupled to the customer allocation portal 50 (e.g., via communications network 7 shown in FIG. 3). In some implementations, one or more months (e.g., 1 month, 3 months, 6 months, 12 months, more than 12 months, or the like) of historic utility bill statements may be retrieved by the customer allocation portal 50 from the database (e.g., database 34 of the utility 30 shown in FIG. 3).

At operation 120, the customer allocation portal 50 may determine a historic energy usage rate of the customer based on the retrieved data record. In some implementations, the customer allocation portal 50 may periodically and/or dynamically determine the historic energy usage rate as data from utility bill statements become available in the database, and/or as new utility bill statements are added to the database. In some implementations, at least one utility bill statement from the data record may be used to determine the historic energy usage rate of the customer. For example, energy usage in the data record for one month may be used to estimate and/or determine the energy usage for the customer for a one year period. In another example, a plurality of months (e.g., 3 months, 6 months, 12 months, more than 12 months, or the like) of energy usage in the data record may be used to estimate and/or determine the energy usage of the customer.

In some implementations, the customer allocation portal 50 may extract, scrape, and/or separate energy usage rates from the retrieved data records to determine the historic energy usage rate for a customer. The customer allocation portal 50 may continuously and/or periodically determine whether new utility bill statements become available in the database, and may revise and/or recalculate the historic energy use rate for the customer.

In some implementations, the customer allocation portal 50 shown in FIG. 3 may determine the dynamic annual usage of energy for a plurality of customers as whole, based on daily information about usage of energy received for any individual customer. The customer allocation portal 50 may annualize usage for a particular customer, based on utility bill statements, and/or based on updated utility bill statements (e.g., using utility bill statements as they become available in electric utility database 34 shown in FIG. 3). Usage by an individual customer may be monitored by the customer allocation portal 50, based on new and/or updated utility bill statements that may be available (e.g., from electric utility database 34).

In some implementations, the customer allocation portal 50 may determine annualized usage when less than 12 months of historic utility bill statements are available (e.g., from electric utility database 34). For a particular customer, the server may retrieve the available utility bill statements for the past year. The usage rates for the customer may be extracted and/or scraped from each month of the retrieved utility bill statements that are available. For the months of the year that the utility bill statements are unavailable for, the customer allocation portal 50 may interpolate an estimated usage amount based on the usage rates from other months that the utility bill statements are available. For example, a yearly annualize usage for a utility (e.g., utility 30 shown in FIG. 3) may be a first value. From the available months of utility bills, a customer may have a usage having a second value, which is less than the first value, and where the customer's usage is for less than one year. The second value may be multiplied by a parameter to determine a customer's usage for one year to form a resulting product. The first value may be subtracted from the resulting product, and the result of the subtraction may be divided by the first value. The resulting quotient may be adjusted, for example, by adding another value to form a multiplier.

In this implementation, for every month of a year that billing statements are unavailable for a customer, a value of a utility's average month usage may be multiplied by the multiplier. The usage values for months for the year for the customer (including the interpolated values and actual usage values) may be added together to determine the annualized usage for the customer.

In some implementations, when fewer than 12 months of billing statements are available for a customer, the customer allocation portal 50 may divide total usage from the available months of billing statement by 12, and then multiply by the difference between 12 months and the available number of months (i.e., 12—available months). In some implementations, when fewer than 12 months of billing statements are available for a customer, the customer allocation portal 50 may assume that the customer matches an average customer of the utility based on publicly available data.

In some implementations, when fewer than 12 months of billing statements are available for a customer, the customer allocation portal 50 may assume a predetermined annual usage value. In other implementations, when fewer than 12 months of billing statements are available for a customer, the customer allocation portal 50 may use the data from the available months of billing statement, and any months of the year for which no data is available may not be counted (i.e., the months may have a zero value).

At operation 130, the customer allocation portal 50 may determine whether the customer is eligible to subscribe to a community solar energy generating system (e.g., community solar energy generating system 200 shown in FIG. 3). This determination may be based, for example, on a geographic location of the community solar energy generating system, the determined historic energy usage rate of the customer, and the geographic location of the customer. In some implementations, the customer allocation portal 50 may prioritize the customer from a plurality of customers for eligibility based on at least one of historic energy usage, whether the geographic location of the customer is within a predetermined distance from the community solar energy generating system, whether the customer is a previous customer, whether the customer is a current customer, and/or whether the customer is a new customer.

At operation 140, the customer allocation portal 50 may determine an allocation of energy produced by the community solar energy generating system when the eligible customer is enrolled in a subscription to the community solar energy generating system. The allocation of energy may be periodically and/or dynamically determined by the customer allocation portal 50. The allocation for the customer and/or a plurality of customers may be made for a new community solar energy generating system and/or an existing community solar energy generating system.

In some implementations, the customer allocation portal 50 may determine a project allocation of energy to be generated by the community solar energy generating system. For example, before construction of or before operating the community solar energy generating system, the customer allocation portal 50 may determine the energy to be generated by the community solar energy generating system, and how it may be allocated to a plurality of customers. In some implementations, the customer allocation portal 50 may prioritize which customers to allocate energy generated by the community solar energy generating system based on at least one of historic energy usage, whether the geographic location of the customer is within a predetermined distance from the community solar energy generating system, whether the customer is a previous customer, whether the customer is a current customer, and whether the customer is a new customer. In some implementations, renewable energy certificates (RECs) and/or credits may be provided to a customer based on the customer's energy usage. These RECs and/or credits may be provided independent of the customer's allocation of energy generated by the community solar energy generating system. Alternatively, in some implementations, allocation of energy may determine a number and/or amount of RECs and/or credits that a subscribing customer may receive.

As customers are added to a project for the community solar energy generating system and assigned an energy allocation, the customer allocation portal 50 may determine whether the community solar energy generating system may accommodate one or more new customers. The customer allocation portal 50 may sum the energy usage of all customers that have an allocation for energy generated by the community solar energy generating system. The total estimated production of energy for the community solar energy generating system for a predetermined period of time (e.g., for a year) may be divided by the total customer usage.

The customer allocation portal 50 may adjust a customer's usage with a multiplier (i.e., a "usage factor") in order to have the maximum number of customers use the community solar energy generating system. The usage factor may be a multiplier of a predetermined percentage and/or range of percentages of a customer's energy usage. For example, the customer allocation portal 50 may add new customers using a first predetermined usage factor, and may increase the usage factor to a second predetermined usage factor if there are not enough customers to use the energy produced by the community solar energy generating system at the first predetermined usage factor. Adjustment of the usage factor may enable the customer allocation portal 50 to allocate the energy produced by the community solar energy generating system when there is unallocated energy production and the potential subscriber usage has run out because of the lower usage factor percentage for the allocation. In some implementations, the customer allocation portal 50 may adjust the usage factor based on applicable state and/or federal law, regulations, and/or additional rules.

The customer allocation portal 50 may determine a product of a total energy usage by the plurality of customers and a usage factor that is respectively multiplied by an energy usage of each customer of the plurality of customers, and dividing the determined product by a total energy production of the community solar energy generating system. That is, to fully allocate energy produced by the community solar energy generating system, the total usage across the customer base may be multiplied by the usage factor to form a product, which may be divided by the total energy production of the community solar energy generating system. This may be represented by the following equation:

$$\text{project\_allocation} = ((\text{total subscriber usage} * \text{usage factor}) / \text{project\_total\_production})$$

In some implementations, the value of the project allocation may be one (1). The customer allocation portal 50 may adjust the usage factor to allocate the total energy production of the community solar energy generating system to the plurality of customers.

In some implementations, determining the allocation of the energy for an individual customer at operation 140 may include the customer allocation portal 50 determining a product between the energy usage of the customer and a usage factor, and dividing the determined product by a total energy production of the community solar energy generating system. That is, an individual customer allocation of energy may be determined by the customer allocation portal 50 using the following equation:

$$\text{allocation} = (\text{subscriber usage} * \text{usage factor}) / \text{project\_total\_production}$$

The usage factor may be used by the customer allocation portal 50 as a multiplier to determine each individual customer allocation. In some implementations, RECs and/or credits may be provided to a customer based on the customer's energy usage, independent of the customer's allocation of energy generated by the community solar energy generating system. Alternatively, in some implementations, the customer allocation may be transmitted by the customer allocation portal 50 to a utility (e.g., energy utility 30 shown in FIG. 3) to indicate how much solar-generated energy may be allocated to a customer and/or the amount of RECs and/or credits that a subscribing customer may receive based on the allocation.

The utility (e.g., energy utility 30) may use this percentage to allocate solar credits accordingly. Solar credits may reduce a utility bill for the customer that is subscribed to the community solar energy generating system, where the utility bill may include credits for the solar energy generating system and charges for one or more other energy generating systems based on an amount of solar energy generated and/or an energy allocation of the customer. The allocation may typically add up to one (1). That is, the customer allocation portal 50 may adjust the usage factor for the customer based on available energy from the total energy production of the community solar energy generating system.

In some implementations, the customer allocation portal 50 may maintain a list of customers that may be eligible to receive energy generated by the community solar energy generating system that may replace customers who discontinue service and/or are no longer eligible to subscribe to the community solar energy generating system. The list of such customers may be referred to a waitlist. The customer allocation portal 50 may determine a coverage percentage, which may be a total usage of all customers on the waitlist to receive energy from the community solar energy generating system, as well as those customers currently receiving energy from the community solar energy generating system. The coverage percentage may be preferably 100% or greater, but may be other suitable percentages. The customer allocation portal 50 may determine an allocation percentage, which may be a sum of all allocations for the community solar energy generating system. The allocation percentage may be preferably 100%, but may be other suitable percentages.

At operation 150, the customer allocation portal 50 may generate a customer data record based on one or more credits for the allocation of energy from the community solar energy generating system and from receiving energy from one or more other energy generating systems (e.g., utility 30 shown in FIG. 3).

Figure 5:
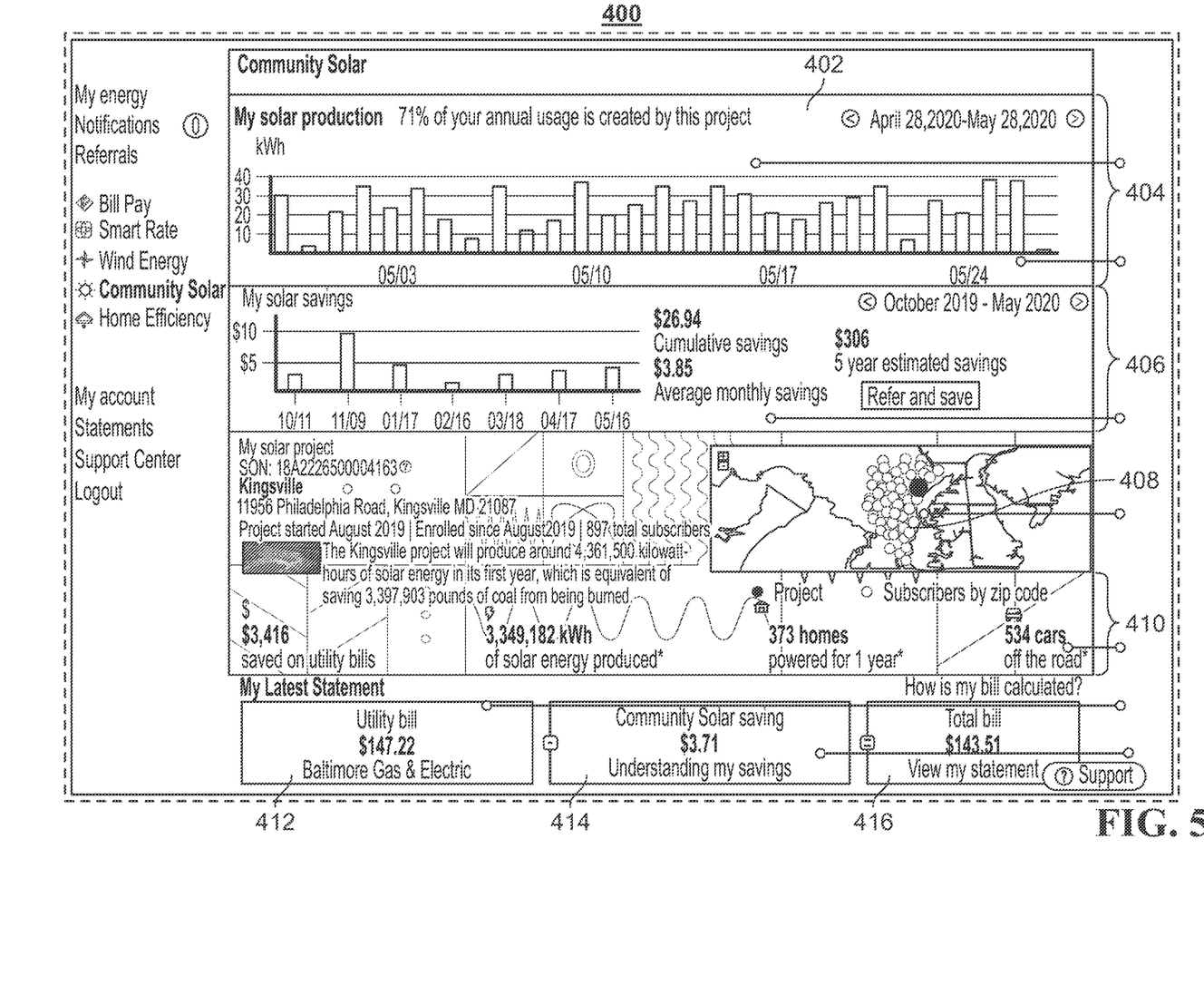
FIG. 5 shows a display of the customer's allocation and individual solar production, community solar energy generating system impact statistics, savings for a utility bill, and combined utility costs according to an implementation of the disclosed subject matter.
Figure 6:
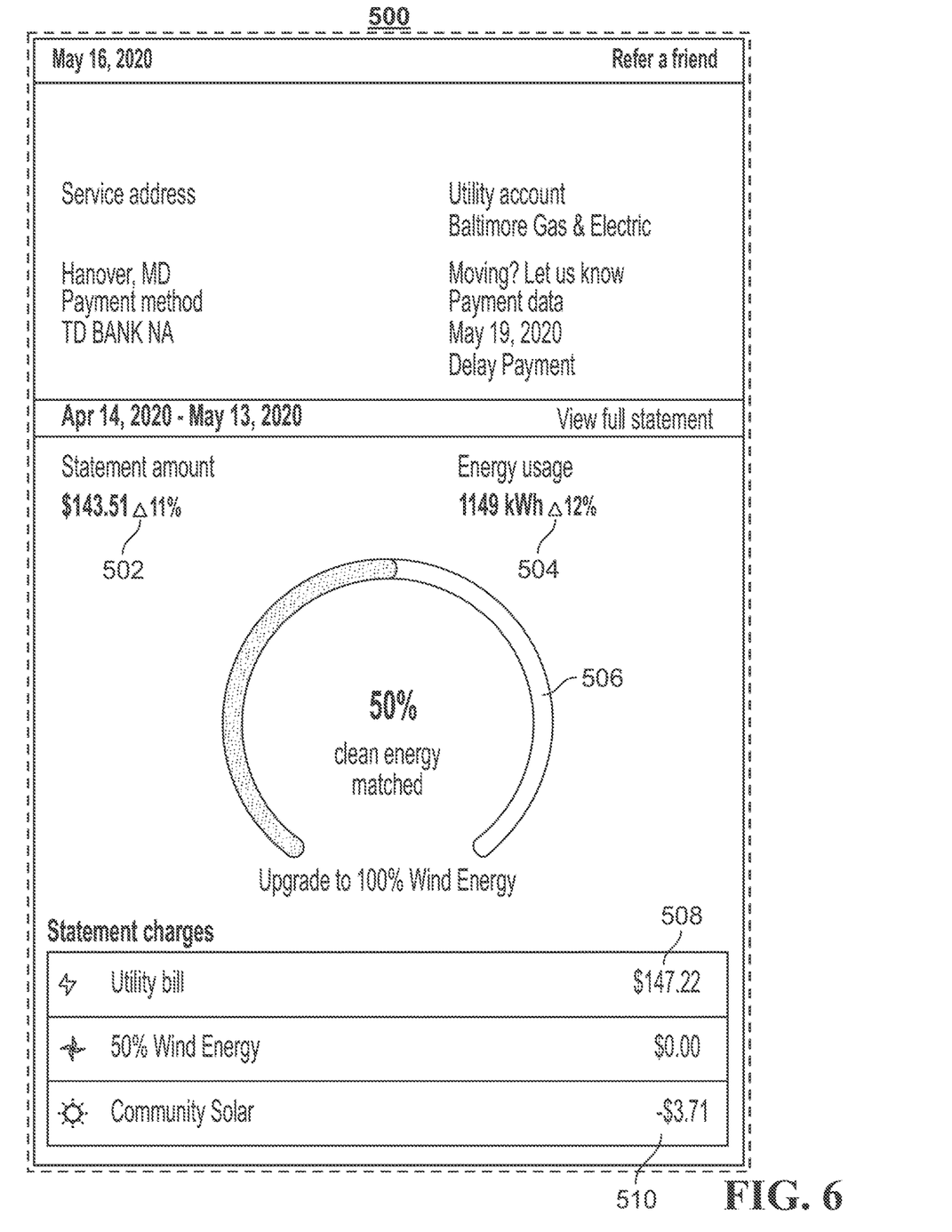
FIG. 6 shows a display for a customer account that includes energy usage, billing statement amount, and savings based on use of the community solar energy generating system according to an implementation of the disclosed subject matter.
Figure 7:
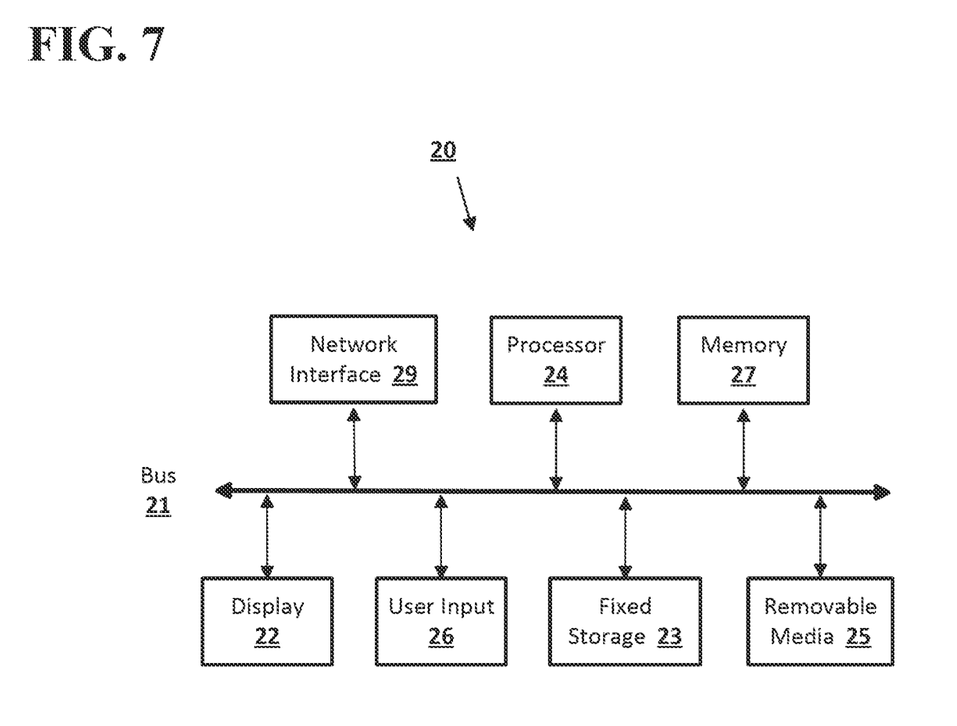
FIG. 7 shows a customer's device that may interface with the network arrangement shown in FIG. 3 according to an implementation of the disclosed subject matter.

At operation 160, the customer allocation portal 50 may transmit the customer data record via a communications network (e.g., communications network 7 shown in FIG. 3) to a device of the customer to be displayed (e.g., device 20 shown in FIGS. 3 and 7). Example displays are shown in FIGS. 5-6, as discussed in detail below. In some implementations, the customer data record may include billing information for the customer for credits based on the allocation of energy from the community solar energy generating system and energy usage of the one or more other energy generating systems (e.g., energy provided by utility 30 shown in FIG. 3).

In some implementations, the customer allocation portal 50 may dynamically track energy usage by the customer (e.g., usage of energy provided by utility 30). In some implementations, the server 13 may retrieve energy usage for a customer from the utility 30 via the electric utility customer portal 32 and/or from the electric utility database 34 shown in FIG. 3. The server may transmit, via the communications network, the dynamically tracked energy usage for display. For example, FIG. 6 shows a display 500 that includes the energy usage (e.g., 1149 kWh) of the customer in display item 506 that may be displayed on a display of device 20 shown in FIG. 3 (e.g., display 22 of device 20 shown in FIG. 7).

In some implementations, the customer allocation portal 50 may periodically and/or dynamically determine whether to adjust the allocation of energy to the customer based on a plurality of customers subscribing to the energy generated by the community solar energy generating system. That is, the customer allocation portal 50 may determine whether to continue to provide the customer with the previously-determined allocation, and/or whether to adjust the allocation for the customer (e.g., increase the allocation, decrease the allocation, or deny the allocation) based on energy allocation for the one or more other customers.

Figure 2:
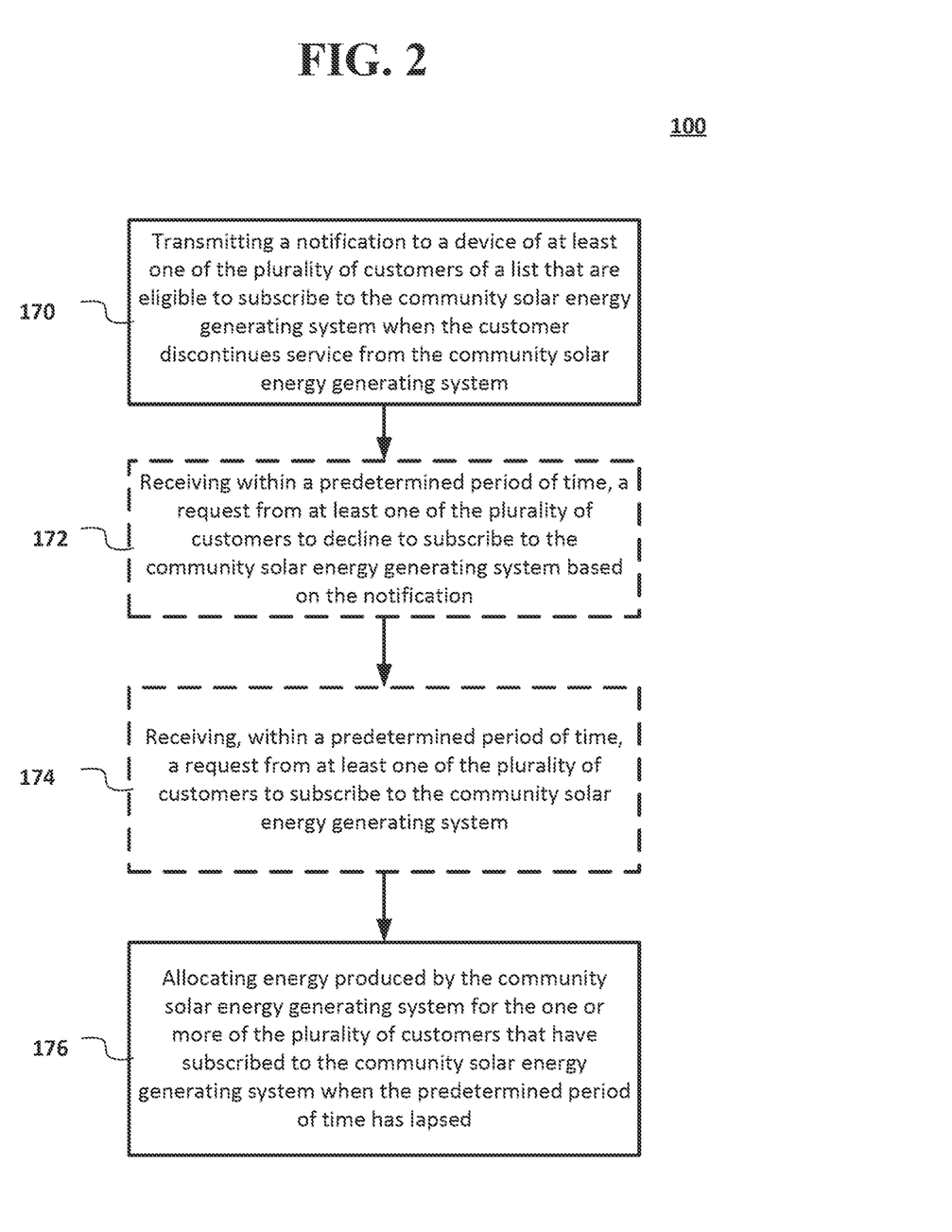
FIG. 2 shows additional example operations for the method of FIG. 1 which may determine whether one or more of a plurality of customers may subscribe to the community solar energy generating system when one customer discontinues service according to an implementation of the disclosed subject matter.

FIG. 2 shows additional example operations for the method 100 of FIG. 1 which may determine whether one or more of a plurality of customers may subscribe to a community solar energy generating system when one customer discontinues service according to an implementation of the disclosed subject matter.

Before adding a customer to a community solar energy generating system as a subscriber, one or more notifications (e.g., emails, text messages, or the like) may be transmitted to alert the customer of their opportunity to receive an allocation of energy generated by the community solar energy generating system. In some implementations, the customer allocation portal 50 may transmit the notifications to a customer device 20. In some implementations, one or more customer service representatives that have devices communicatively coupled to customer allocation portal 50 and network 7 may prepare and transmit the notifications to the customer device 20 via the customer allocation portal 50. The notification may provide the customer with an option to decline service (i.e. opt-out) if they do not want to participate. In some implementations, the customer allocation portal 50 may batch-process one or more customers on the waitlist which may be stored in a database. These customer may be awaiting to subscribe to the community solar energy generating system. The customer allocation portal 50 may assign the one or more customers with an opt-out period, and/or update customer subscription statuses in a database (e.g., customer allocation database 52 shown in FIG. 3). When the opt-out period has closed, the customer allocations may be submitted to the utility (e.g., utility 30 shown in FIG. 3) by the customer allocation portal 50, and may be stored in the customer allocation database 52 and/or the electric utility database 34 shown in FIG. 3. In some implementations, the allocations may be directly inputted into the utility system.

At operation 170, the customer allocation portal 50 may transmit, via communications network (e.g., communications network 7 shown in FIG. 8), a notification to a device (e.g., device 20 shown in FIGS. 3 and 7) of at least one of the plurality of customers of a list (i.e., the waitlist) to subscribe to the community solar energy generating system when the customer discontinues service from the community solar energy generating system.

At operation 172, the customer allocation portal 50 may optionally receive, within a predetermined period of time, a request to decline (i.e., opt-out) to subscribe to the community solar energy generating system based on the notification. The request may be a communication (e.g., email, text, or the like) from one or more of the plurality of customers.

At operation 174, the customer allocation portal 50 may optionally receive, within a predetermined period of time, a request from at least one of the plurality of customers to subscribe to community solar energy generating system. In some implementations, the customer allocation portal 50 may enroll the one or more customers in a subscription that do not opt-out within the predetermined period of time (as discussed above in operation 172). In some implementations, the customer allocation portal 50 may automatically enroll the one or more customers if no messages to opt-out or to accept enrollment have been received within a predetermined period of time. At operation 176, the customer allocation portal 50 may allocate (such as described above) the energy produced by the community solar energy generating system for the one or more of the plurality of customers that have subscribed to the community solar energy generating system when the predetermined period of time has lapsed.

FIG. 3 shows a network arrangement of energy generating systems, servers, databases, and customer devices according to an implementation of the disclosed subject matter. A utility 30 (i.e., an electric utility) may generate electricity to be provided to one or more customers via a power grid. The utility 30 may include a server that provides an electric utility customer portal 32, which may allow customers to access account information with the utility 30. Account information may include, for example, utility bills, payment information, amount of energy used, address and contact information, and the like. The server of the utility 30 may be one or more hardware servers and or a cloud server. The server of the utility 30 that provides the electric utility customer portal 32 may be communicatively coupled to an electric utility database 34, which may store, among other things, historic utility bill statements for one or more customers. The utility 30 may be communicatively coupled to the server 13 via communications network 7.

The server 13 may be one or more hardware servers, cloud servers or the like, and may be connected to a solar inverter 40, and a solar energy generating system 42 (i.e., the community solar energy generating system). The solar inverter 40 may convert direct current (DC) output of a photovoltaic (PV) solar panels of the energy generating system 42 into an alternating current (AC) that may be provided into a commercial electrical grid, which may be the same power grid that the utility 30 is connected to. The solar inverter 40 may include a server (e.g., one or more hardware servers, a cloud server, or the like) to provide data logging and/or an application program interface (API). The data logger may determine the amount of energy generated by the solar energy generating system 42 over a predetermined period of time (e.g., one or more hours of the day, the amount of energy generated for one or more months, the amount of energy generated over a year, or the like). The API may provide at least a portion of the logged data to the server 13 and/or the customer device 20, and may be used to update (e.g., add, remove, or the like) customers that may be subscribed to the community solar energy generating system.

Customer allocation portal 50 may be provided by a server (e.g., one or more hardware servers, a cloud server, or the like), which may be communicatively coupled to customer allocation database 52. The allocation portal 50 may be accessed, for example, by the server 13 to set and/or adjust an allocation of the energy for a customer that is subscribed to the community solar energy generating system. The set and/or adjusted allocation for a customer may be stored in the customer allocation database 52.

The utility 30, the server 13, the customer allocation portal 50, and a customer device 20 (described below in connection with FIG. 7) may be communicatively connected via communications network 7. The network 7 may be a local network, wide-area network, the Internet, or any other suitable communication network or networks, and may be implemented on any suitable platform including wired and/or wireless networks.

Figure 4:
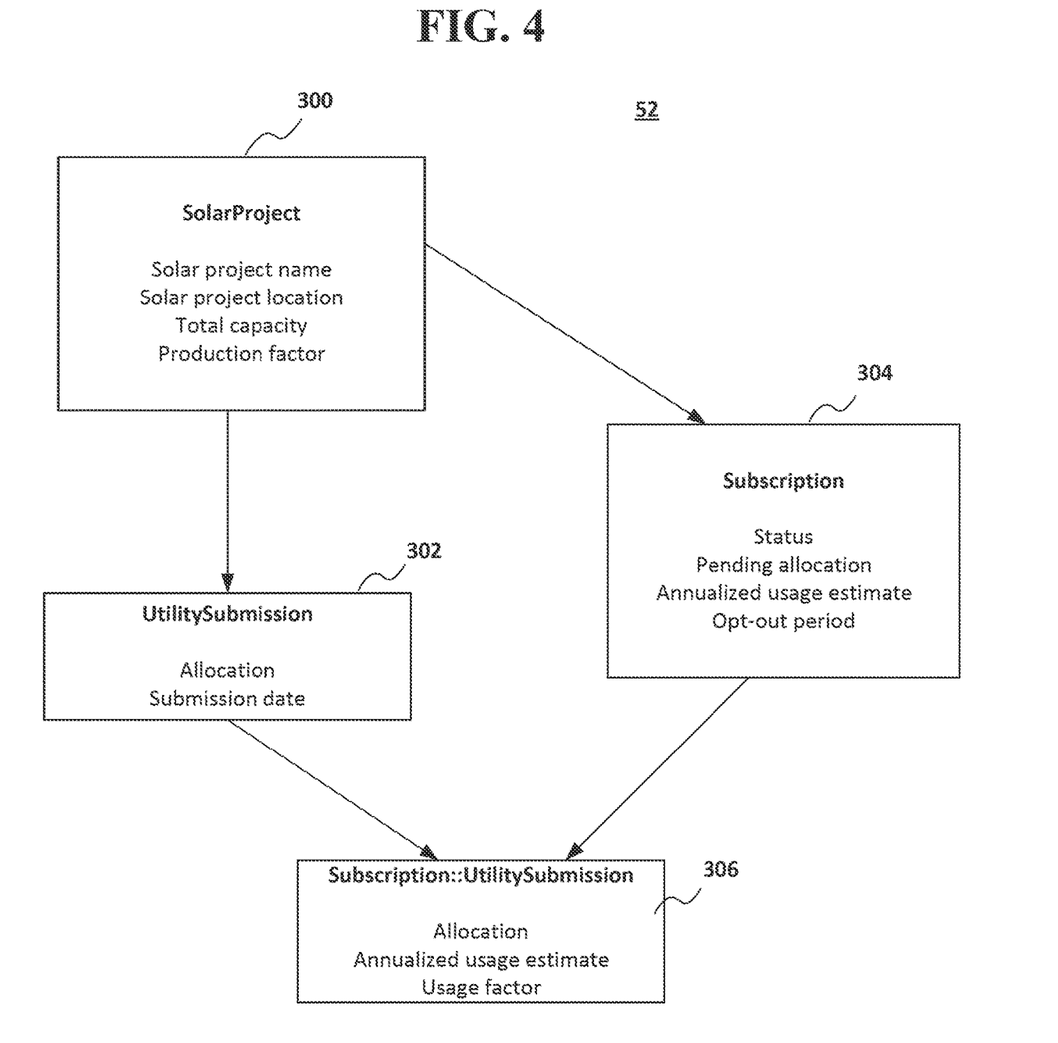
FIG. 4 shows an example database structure for a database according to an implementation of the disclosed subject matter.

FIG. 4 shows a management data model that is stored in a database (e.g., customer allocation database 52 shown in FIG. 3) to track submission of customer allocations to a utility (e.g., utility 30 shown in FIG. 3) and/or rolling allocations by the customer allocation portal 50. The data structure 300 (i.e., SolarProject) may be for a solar energy project (i.e., a community solar energy generating system to be built or presently in operation, such as energy generating system 42 shown in FIG. 3), that may include the name of the project, the location of the project, the total energy-generating capacity of the project, and a production factor. The production factor may be a measure of how much energy is generated per unit of system capacity, and may be expressed in kWh/kW (e.g., where kWh is the energy output, and kW is the capacity). The data structure 302 (i.e., Utility Submission) may include an energy allocation for the solar energy project (e.g., a community solar energy generating system), and a submission date of the allocation to a utility (e.g., utility 30 shown in FIG. 3). The data structure 304 (i.e., Subscription) may include a status of a customer (e.g., active, awaiting allocation, discontinued service, or the like), a pending energy allocation amount of the customer, an annualized usage estimate (e.g., an estimate historic energy usage rate), and a length of an opt-out period (e.g., the length of time that the customer has to respond to a notification to accept or decline to receive energy generated by the community solar energy generating system). The data structure 306 (i.e., Subscription::UtilitySubmission) may include the determined allocation of energy for the customer, the annualized usage estimate of energy usage for the customer, and a usage factor (as described above).

In some implementations, the customer allocation portal 50 shown in FIG. 3 may transmit a list of the one or more of the plurality of customers and the respective allocations of energy to a utility (e.g., utility 30 shown in FIG. 3). The utility may assign an allocation of energy for each of the one or more of the plurality of customers based on the transmitted allocations from the customer allocation portal 50. The allocations for each customer may be stored in customer allocation database 52 shown in FIG. 3.

The customer allocation portal 50 may dynamically track energy allocation to one or more of the plurality of customers. The customer allocation portal 50 may transmit, via the communications network (e.g., communications network 7 shown in FIG. 3), the dynamically tracked energy usage for each of the one of more of the plurality of customers for display.

FIG. 5 shows a display 400 which may be displayed, for example, on display 22 of device 20 shown in FIGS. 3 and 7. The display 400 may be transmitted from the customer allocation portal 50 to the device 20 via the network 7. Display item 402 may be a usage factor (e.g., 71%, which may be the percentage of the customer's usage that is covered by the customer's allocation to the solar project) for a customer of the energy produced from the community solar energy generating system. Display item 404 may include an individual solar production for a customer. For example, a bar graph may show kilowatt hours (kWh) of energy production over different days. The display item 404 may include daily data from a data acquisition system (DAS) of the community solar energy generating system, which may be multiplied by the allocation for the customer. The DAS may be part of solar inverter 40 shown in FIG. 3. Display item 406 may include savings and/or credits from using the community solar energy generating system. For example, the customer may have a cumulative savings of $26.94, an average monthly savings of $3.85, and a 5 year estimated savings of $306.

Display item 408 may show a map of customers that are subscribed to the community solar energy generating system, by a particular zip code or other geographic identifier. Display item 410 may include impact statistics of the community solar energy generating system. For example, customers using the community solar energy generating system may have $3416 saved on utility bills, 3,349,182 kWh of energy produced, 373 homes powered for one year, and have 534 cars on the road (i.e., the number of passenger vehicles driven for one year, where the amount of clean energy produced by the solar project may have a greenhouse gas reduction the same as or similar to removing 534 cars from the road for a year). In some implementations, the display 410 may include the number of electric vehicles charged for a predetermined period of time. Display item 412 may be the combined utility (e.g., energy provided by the utility 30 shown in FIG. 3) and community solar energy generating system (e.g., energy generating system 42 shown in FIG. 3) charges for energy (e.g., $147.22). Display item 414 may be the savings (e.g., $3.71) achieved by a customer for using the community solar energy generating system. Display item 416 may be the total bill for the customer, which may be the savings from display item 414 subtracted from the charges for energy shown in display item 412.

FIG. 6 shows a display 500 for a customer account that includes energy usage, billing statement amount, and savings based on use of the community solar energy generating system according to an implementation of the disclosed subject matter. The display 500 may be transmitted from the server 13, remote platform 17, and/or energy utility 18 shown in FIG. 8 to be displayed on display 22 of device 20 shown in FIGS. 3 and 7.

Display item 502 may be a billing statement total (e.g., $143.51) which may include a reduction in cost based on the subscription to the community solar energy generating system. Display item 502 may be similar to display item 416 shown in FIG. 5. Display item 504 may be the amount of energy used by the customer for a particular billing cycle (e.g., 1149 kWh), and may be similar to display item 414 shown in FIG. 5. Display item 506 may show a percentage (e.g., 50%) of the customer's usage of clean energy (e.g., wind energy, solar energy, or the like) that may be offset by renewal energy certificates (RECs). Display item 508 may be the utility bill charge (e.g., $147.22) that does not include the discount from community solar energy generating system, which is shown as display item 510. Display item 508 may be similar to display item 412 shown in FIG. 5, and display item 510 may be similar to display item 414 shown in FIG. 5.

Embodiments of the presently disclosed subject matter may be implemented in and used with a variety of component and network architectures. FIG. 7 is an example customer device 20 that may a desktop or laptop computer, or a mobile computing device such as a smart phone, tablet, or the like. In some implementations, the device 20 may be used to manage a subscription to the community solar energy generating system, to manage an account with the utility 30, and/or receive billing information from the customer allocation portal 50. The device 20 may include a bus 21 which interconnects major components of the device 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the device 20 are generally stored on and accessed via a computer readable medium, such as a hard disk drive (e.g., fixed storage 23), an optical drive, floppy disk, or other storage medium.

The fixed storage 23 may be integral with the device 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., sensors, energy use monitors, and the like). Conversely, all of the components shown in FIG. 6 need not be present to practice the present disclosure. The components can be interconnected in different ways from that shown. The operation of the device 20 such as that shown in FIG. 6 is readily known in the art and is not discussed in detail in this application. Code to implement the present disclosure can be stored in computer-readable storage media such as one or more of the memory 27, fixed storage 23, removable media 25, or on a remote storage location.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing implementations of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
   determining, at a server, whether a customer is eligible to subscribe to a community solar energy generating system based on a geographic location of the community solar energy generating system, a historic energy usage rate of the customer, and a geographic location of the customer;
   determining, at the server, whether to provide an allocation of energy to the customer based on an energy allocation of a plurality of customers subscribed to the community solar energy generating system;
   determining, at the server, the allocation of energy produced by the community solar energy generating system to the customer when the eligible customer is enrolled in a subscription to the community solar energy generating system;
   generating, at the server, a customer data record based on one or more credits for the allocation of energy from the community solar energy generating system and receiving energy from another energy generating system; and
   transmitting, from the server via a communications network, the customer data record to a device of the customer to be displayed.

2. The method of claim 1, wherein the historic energy usage rate of the Customer is determined by:
   retrieving, from a database communicatively coupled to the server, a data record including at least one historic utility bill statement of a customer; and
   determining, at the server, the historic energy usage rate of the customer based on the retrieved data record.

3. The method of claim 1, wherein the transmitted customer data record to the device of the customer comprises:
   transmitting, from the server via the communications network, billing information for the customer for the one or more credits for the allocation of energy for the community solar energy generating system and energy usage from the other energy generating system.

4. The method of claim 1, further comprising:
   determining, at the server, a project allocation of energy to be generated by the community solar energy generating system by determining a product of a total energy usage by a plurality of customers and a usage factor that is respectively multiplied by an energy usage of each customer of the plurality of customers, and dividing the determined product by a total energy production of the community solar energy generating system.

5. The method of claim 4, further comprising:
   adjusting, at the server, the usage factor to allocate the total energy production of the community solar energy generating system to the plurality of customers.

6. The method of claim 1, wherein the determining the allocation of the energy for the customer further comprises:
   determining, at the server, a product between the energy usage of the customer and a usage factor, and dividing the determined product by a total energy production of the community solar energy generating system.

7. The method of claim 6, further comprising:
   adjusting, at the server, the usage factor for the customer based on available energy from the total energy production of the community solar energy generating system.

8. The method of claim 1, further comprising:
   prioritizing, at the server, the customer from a plurality of customers for eligibility based on at least one selected from the group consisting of: historic energy usage, whether the geographic location of the customer is within a predetermined distance from the community solar energy generating system, whether the customer is a previous customer, whether the customer is a current customer, and whether the customer is a new customer.

9. The method of claim 1, further comprising:
   transmitting, from the server via communications network, a notification to a device of at least one of the plurality of customers of a list that are eligible to subscribe to the community solar energy generating system when the customer discontinues service from the community solar energy generating system.

10. The method of claim 9, further comprising:
    receiving within a predetermined period of time, at the server, a request from at least one of the plurality of customers to decline to subscribe to the community solar energy generating system based on the notification.

11. The method of claim 9, further comprising:
    receiving within a predetermined period of time, at the server, a request from at least one of the plurality of customers to subscribe to the community solar energy generating system; and
    allocating, at the server, energy produced by the community solar energy generating system for the one or more of the plurality of customers that have subscribed to the community solar energy generating system when the predetermined period of time has lapsed.

12. The method of claim 11, further comprising:
    transmitting, from the server to a second server of a utility, a list of the one or more of the plurality of customers and the respective allocations of energy; and
    assigning, at the second server of the utility, an allocation of energy for each of the one or more of the plurality of customers based on the transmitted allocations.

13. The method of claim 11, further comprising:
    dynamically tracking, at the server, energy allocation to one or more of the plurality of customers.

* * * * *